(12) United States Patent
Pinarbasi

(10) Patent No.: US 7,241,697 B2
(45) Date of Patent: *Jul. 10, 2007

(54) METHOD FOR SENSOR EDGE CONTROL AND TRACK WIDTH DEFINITION FOR NARROW TRACK WIDTH DEVICES

(75) Inventor: Mustafa Michael Pinarbasi, Morgan Hill, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,023

(22) Filed: Jul. 7, 2005

(65) Prior Publication Data

US 2007/0010043 A1  Jan. 11, 2007

(51) Int. Cl.
*H01L 21/302* (2006.01)
*H01L 21/461* (2006.01)

(52) U.S. Cl. .............. 438/738; 257/755; 257/E21.53; 257/E21.232; 438/105

(58) Field of Classification Search .............. 438/105, 438/738; 257/775, E21.236, E21.53, E21.232
See application file for complete search history.

(56) References Cited

U.S. PATENT DOCUMENTS

| | | | |
|---|---|---|---|
| 5,279,921 A * | 1/1994 | Onishi et al. ............ 430/270.1 |
| 5,340,684 A * | 8/1994 | Hayase et al. ............... 430/166 |
| 5,563,754 A | 10/1996 | Gray |
| 6,198,607 B1 * | 3/2001 | Cain et al. ............... 360/318.1 |
| 6,212,047 B1 | 4/2001 | Payne et al. |
| 6,316,329 B1 | 11/2001 | Hirota et al. |
| 6,320,725 B1 * | 11/2001 | Payne et al. ................. 360/125 |
| 6,399,269 B2 * | 6/2002 | Mizutani et al. ......... 430/270.1 |
| 2002/0015909 A1 * | 2/2002 | Mizutani et al. ......... 430/270.1 |
| 2002/0093761 A1 | 7/2002 | Payne et al. |
| 2005/0068672 A1 * | 3/2005 | Lee et al. .................... 360/126 |
| 2006/0000795 A1 * | 1/2006 | Chen et al. ................... 216/22 |
| 2006/0067009 A1 * | 3/2006 | Cyrille et al. ............ 360/324.1 |

OTHER PUBLICATIONS

Etching mask for ceramic substrate, Research Disclosure Journal, ISSN 0374-4353, Kenneth Mason Publications Ltd. Feb. 1986.*

* cited by examiner

*Primary Examiner*—Michelle Estrada
*Assistant Examiner*—Jarrett J. Stark
(74) *Attorney, Agent, or Firm*—Bracewell & Giuliani LLP

(57) ABSTRACT

A process for defining and controlling the track width for sensor devices is disclosed. An RIE-resistant, image layer, such as Cu or NiFe, is deposited after the DLC layer. A combination of RIE and ion milling processes or reactive ion beam etching processes are used to form the mask structure. Having an RIE-resistant layer precisely defines the DLC edge and minimizes the line edge roughness that result from fast removal of duramide during RIE. This solution controls the formation of the edges of the sensors and provides good definition for DLC mask edges. The image layer may be chemical mechanical polished to eliminate ion milling before the final RIE step.

16 Claims, 3 Drawing Sheets

METHOD FOR SENSOR EDGE CONTROL AND TRACK WIDTH DEFINITION FOR NARROW TRACK WIDTH DEVICES

BACKGROUND OF THE INVENTION

1. Technical Field

The present invention relates in general to the masking of devices during processing and, in particular, to an improved system and method for improved masking of sensors during processing for better sensor edge control and track width definition for sensors having a narrow track width.

2. Description of the Related Art

Current mask processes can be prone to track width (TW) control and junction definition issues between the various layers of the product that define the sensor width. Some of these problems are illustrated in FIG. 1, which is a tunneling electron microscope (TEM) image of a sectioned masked wafer site 17. For example, the freelayer has a TW length 11 that is wider than the width 13 of the mask. In addition, the side 15 of the mask (e.g., into and out of the page) is relatively rough rather than straight, and the edges of the diamond-like carbon (DLC) mask layer are sloped rather than relatively sharp.

The reasons for these variations are the different reactive ion etching (RIE) etch rates for the different mask layers. For example, duramide etches significantly faster (e.g., about 45 Å/sec compared to about 16.7 Å/sec) than either DLC or photoresist (e.g., TIS). Since duramide is the masking layer for DLC, there is no static mask for DLC. This makes it nearly impossible to obtain well-defined DLC edges, which can induce large junction variations.

FIG. 2 depicts one prior art example that illustrates the results of these differences in etch rates. The left side of FIG. 2 depicts an initial spin step 21 wherein layers of photoresist (e.g., TIS) 23, hydronhilic polymers of acrylamide (e.g., DURAMIDE) 25, and DLC 27 are formed on a sensor 35. In step 29 (center of FIG. 2), the layers are exposed and developed such that photoresist 23 is reduced, while DURAMIDE 25 and DLC 27 are essentially unchanged. In RIE/ion mill step 31 (right side of FIG. 2), the various layers are reduced, but it is virtually impossible to predict or control the resultant width 33 of the layers. Although these conventional processing techniques can produce desirable results, the inability to consistently manipulate the end results is less than satisfactory. In particular, it would be helpful to obtain a well-defined carbon mask that does not depend upon the fast-etched DURAMIDE layer for TW definition.

SUMMARY OF THE INVENTION

One embodiment of a system and method for obtaining well-defined DLC mask edges includes a static mask for the DLC layer. In the solution of the present invention, an RIE-resistant layer is deposited after the DLC layer. This new layer can be relatively thin since the RIE process is short. A combination of RIE and reactive ion beam etching (RIBE) processes, and ion milling processes are used to form the mask structure. The RIE-resistant layer precisely defines the DLC edge and minimizes the line edge roughness that results from fast removal of duramide during RIE.

This solution for controlling the formation of the edges of the sensors (i.e., width) has many advantages. It provides the best definition for DLC mask edges. It is also desirable for the new image layer to be chemically-mechanically polished (CMP) to eliminate ion milling before the final RIE step. The high mill rate of the RIE-resistant or image layer is desirable as it reduces ion mill consumption of resist. The RIE-resistant layer may be formed from different types of material, such as Rh, Cu, NiFe, and the like. The DLC layer defines the TW and yields sharp sensor edge definition.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
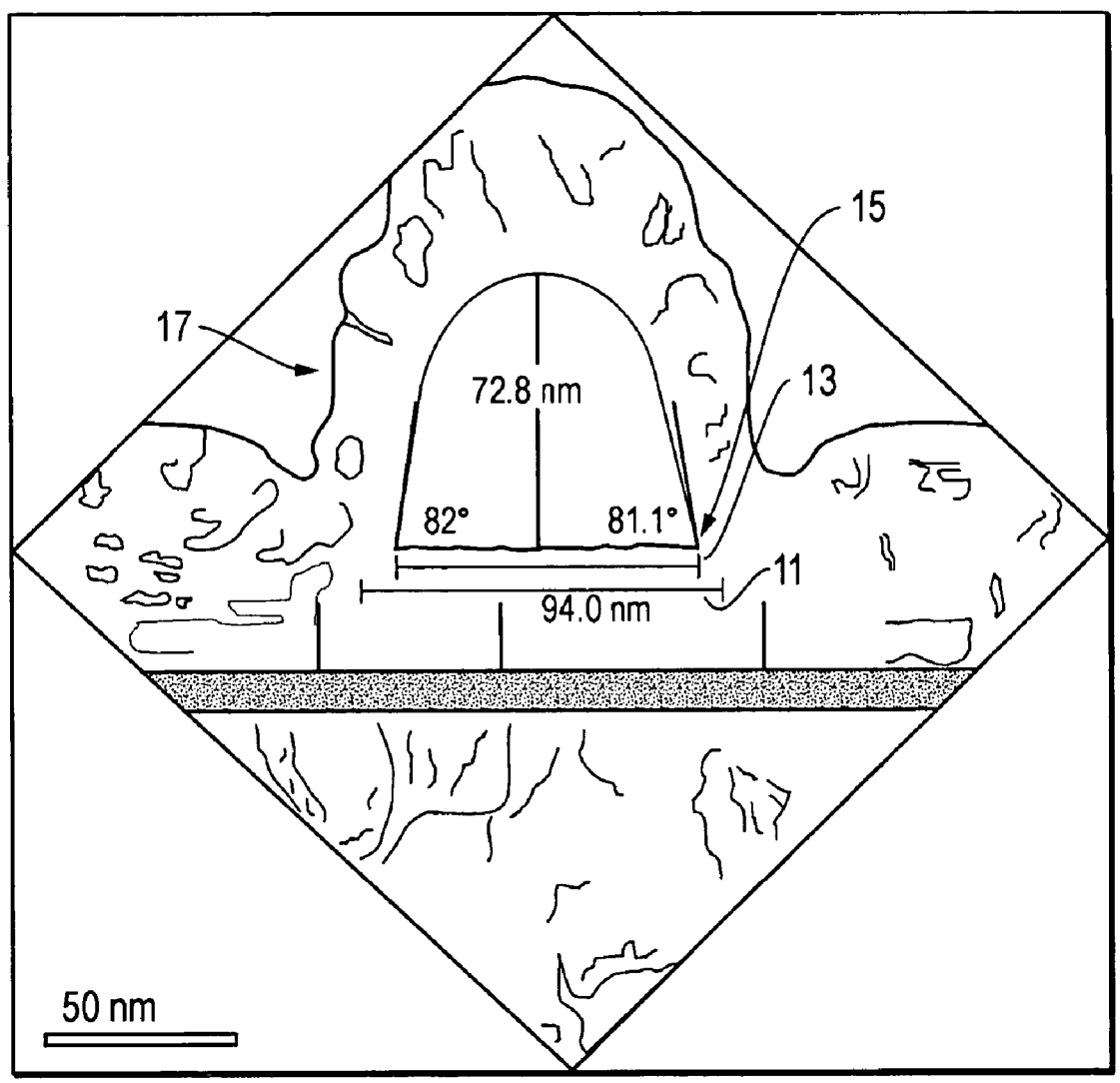
FIG. 1 is a sectional side view of a tunneling electron microscope image of a conventionally masked sensor.
Figure 2:
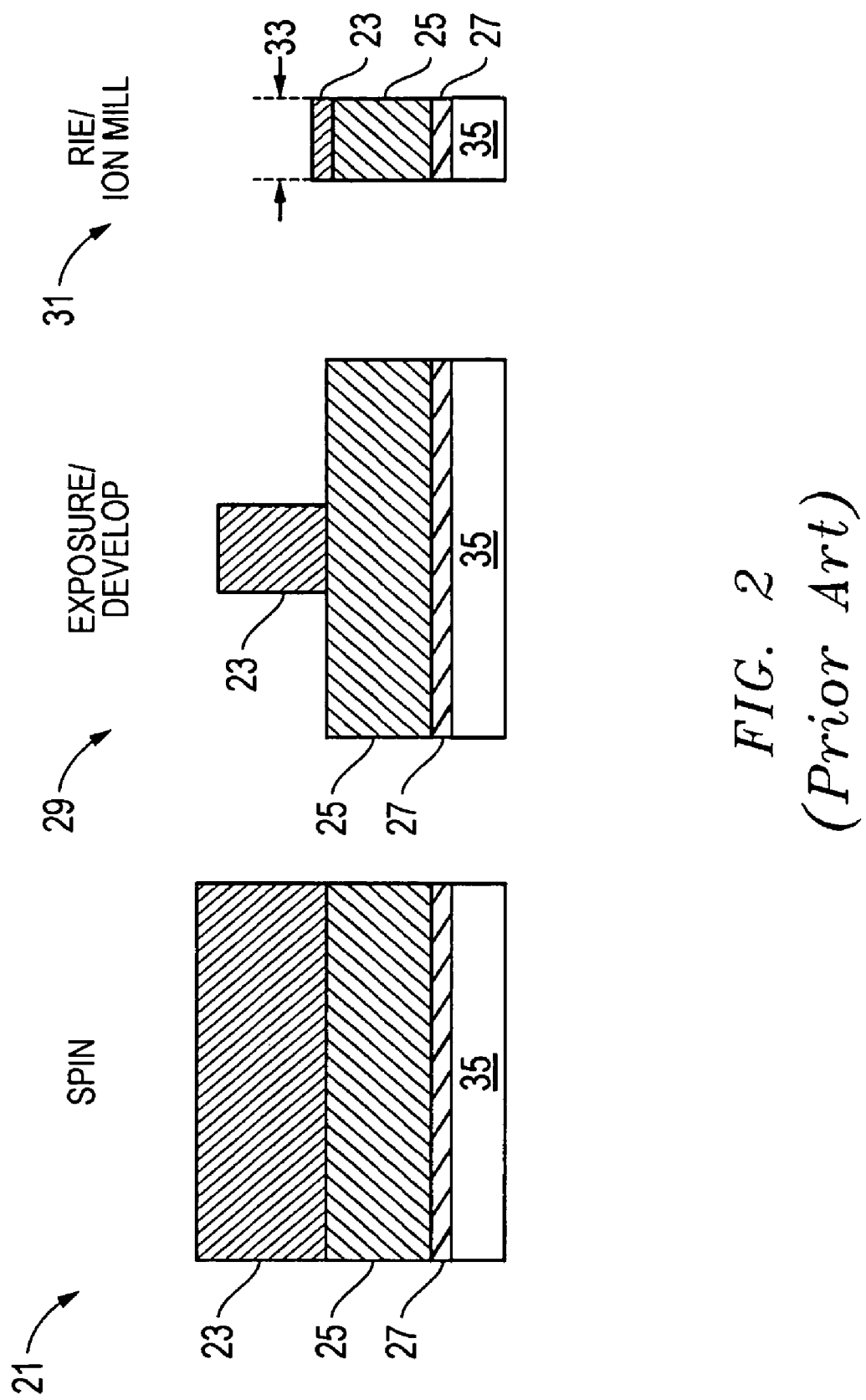
FIG. 2 is a schematic diagram of a conventional masking process.
Figure 3:
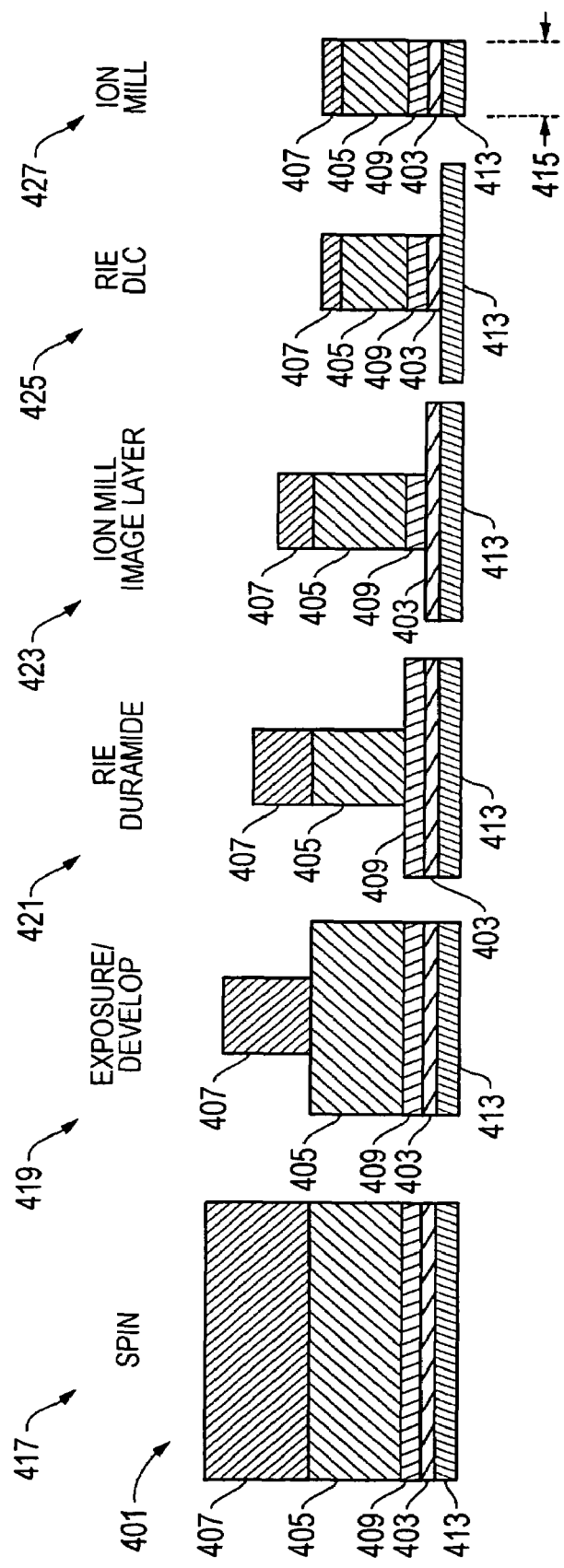
FIG. 3 is a schematic diagram of one embodiment of a masking process constructed in accordance with the present invention.

Referring to FIG. 3, one embodiment of the present invention is shown. At its most basic level, the present invention comprises a system and method of forming masks for structures having relatively narrow track widths. In this disclosure, "narrow" TWs are defined as those less than approximately 100 nm, but this depends upon the application and the processes used.

As shown in FIG. 3, one embodiment of the present invention comprises defining a structure 401 having a DLC layer 403, a layer of hydrophilic polymers of acrylamide (e.g., DURAMIDE) 405, and a photoresist (e.g., TIS) layer 407. At least one mask or image layer 409 of an RIE-resistant material is also provided. The image layer(s) 409 may be formed with ion milling, but other types of processes including, for example, RIE, ion milling, and reactive ion beam etching may be used as well. In addition, the image layer 409 may be formed from a variety of materials including, for example, Rh, Cu, NiFe, and the like, at a thickness of approximately 20 to 100 Å in one embodiment.

The image layer 409 is located between the DLC layer 403 and the photoresist layer 407. In the embodiment shown, the image layer 409 is located directly between the DLC and hydrophilic polymers of acrylamide layers 403, 405. The sensor device 401 may be processed as illustrated in FIG. 3. In one embodiment, the method comprises forming a structure 401 having a sensor 413 and a mask including a DLC layer 403, a DURAMIDE layer 405, and a photoresist layer 407. The image layer 409 is positioned in the mask between the DLC layer 403 and the photoresist layer 407 to ultimately control a track width 415 (far right side of FIG. 3) of the sensor 413 extending in a direction that is co-planar with a plane defined by the sensor 413. The mask is spin processed 417, exposed and developed 419, and the DURA- MIDE layer 405 is processed, as indicated at step 421. The image layer 409 is ion milled 423. The DLC layer 403 is again processed 425. Finally, ion milling 427 is performed on the structure to define the track width 415 of the mask and the sensor 413.

Reactive ion etching 421 may be directed to the DURAMIDE layer 405, and reactive ion etching 425 may be directed to the DLC layer 403. The image layer 409 may be provided as a RIE-resistant layer that precisely defines an edge of the DLC layer 403 to reduce a line edge roughness thereof. The method may further comprise chemical-mechanical polishing (CMP) the image layer 409 to eliminate ion milling before the second RIE removal step 425. When the image layer 409 is located directly between the DLC and DURAMIDE layers 403, 405, the image layer 409 is a static mask for the DLC layer 403. The formation of the image layer 409 may be performed as described above for the previous embodiment. The image layer 409 may be removed with physical sputtering.

While the invention has been shown or described in only some of its forms, it should be apparent to those skilled in the art that it is not so limited, but is susceptible to various changes without departing from the scope of the invention.

What is claimed is:

1. A method of modifying a track width of a structure with a mask, the method comprising:
    (a) providing a sensor having a track width;
    (b) forming a mask on the sensor, the mask having a DLC layer, a hydrophilic polymer of acrylamide layer, a photoresist layer, and an image layer of RIE-resistant material located directly between and in contact with the DLC layer and the hydrophilic polymer of acrylamide layer; and then
    (c) processing the sensor and the mask to reduce the track width of the sensor to a narrow track width of less than approximately 100 nm.

2. A method according to claim 1, wherein step (c) comprises processing the sensor and the mask with processes selected from the group consisting of RIE, ion milling, and reactive ion beam etching.

3. A method according to claim 1, wherein the image layer comprises a material selected from the group consisting of Rh, Cu, and NiFe.

4. A method according to claim 1, wherein the image layer has a thickness in a range of approximately 20 to 100 Å in a direction perpendicular to the track width of the sensor.

5. A method of reducing a track width of a sensor, the method comprising:
    (a) forming a sensor having a track width extending in a horizontal direction;
    (b) forming a mask on top of the sensor in a vertical direction that is perpendicular to the horizontal direction, the mask having a DLC layer, a hydrophilic polymer of acrylamide layer, a photoresist layer, and an image layer of RIE-resistant material located directly between and in contact with the DLC layer and the hydrophilic polymer of acrylamide layer, the image layer having a thickness in the vertical direction in a range of approximately 20 to 100 Å;
    (c) spin processing the mask;
    (d) exposing and developing the mask;
    (e) reactive ion etching the mask;
    (f) ion milling the image layer;
    (g) reactive ion etching the mask; and
    (h) reducing the track width of the sensor to a narrow track width of less than approximately 100 nm.

6. A method according to claim 5, wherein step (e) comprises reactive ion etching the hydrophilic polymer of acrylamide layer, step (g) comprises reactive ion etching the DLC layer, and step (h) comprises ion milling the sensor.

7. A method according to claim 5, further comprising precisely defining an edge of the DLC layer with the image layer to reduce a line edge roughness of the DLC layer.

8. A method according to claim 5, further comprising chemical mechanical polishing the image layer to eliminate ion milling before step (g).

9. A method according to claim 5, further comprising processing the mask with processes selected from the group consisting of RIE, ion milling, and reactive ion beam etching to form the mask.

10. A method according to claim 5, further comprising forming the image layer with a material selected from the group consisting of Rh, Cu, and NiFe.

11. A method according to claim 5, further comprising removing the image layer with physical sputtering.

12. A method of reducing a track width of a sensor, comprising:
    (a) forming a sensor having a track width extending in a horizontal direction;
    (b) forming a mask on top of the sensor in a vertical direction that is perpendicular to the horizontal direction, the mask having a DLC layer, a hydrophilic polymer of acrylamide layer, a photoresist layer, and an image layer of RIE-resistant material selected from the group consisting of Rh, Cu, and NiFe, located directly between and in contact with the DLC layer and the hydrophilic polymer of acrylamide layer, the image layer having a thickness in the vertical direction in a range of approximately 20 to 100 Å;
    (c) spin processing the mask;
    (d) exposing and developing the mask;
    (e) reactive ion etching the hydrophilic polymer of acrylamide layer;
    (f) ion milling the image layer;
    (g) reactive ion etching the DLC layer; and
    (h) ion milling the sensor and reducing the track width of the sensor to a narrow track width of less than approximately 100 nm.

13. A method according to claim 12, further comprising precisely defining an edge of the DLC layer with the image layer to reduce a line edge roughness of the DLC layer.

14. A method according to claim 12, further comprising chemical mechanical polishing the image layer to eliminate ion milling before step (g).

15. A method according to claim 12, further comprising processing the mask with processes selected from the group consisting of RIE, ion milling, and reactive ion beam etching to form the mask.

16. A method according to claim 12, further comprising removing the image layer with physical sputtering.

* * * * *

UNITED STATES PATENT AND TRADEMARK OFFICE
CERTIFICATE OF CORRECTION

| | |
|---|---|
| PATENT NO. | : 7,241,697 B2 |
| APPLICATION NO. | : 11/176023 |
| DATED | : July 10, 2007 |
| INVENTOR(S) | : Mustafa Michael Pinarbasi |

It is certified that error appears in the above-identified patent and that said Letters Patent is hereby corrected as shown below:

Col. 4, Ln. 59: delete "spuffering" replace with --sputtering--

Signed and Sealed this

Twenty-first Day of August, 2007

JON W. DUDAS
*Director of the United States Patent and Trademark Office*